United States Patent [19]

Schulz

[11] Patent Number: 4,820,813

[45] Date of Patent: Apr. 11, 1989

[54] GRINDING PROCESS FOR HIGH VISCOSITY CELLULOSE ETHERS

[75] Inventor: Gary J. Schulz, Midland, Mich.

[73] Assignee: The Dow Chemical Company, Midland, Mich.

[21] Appl. No.: 155,399

[22] Filed: Feb. 12, 1988

Related U.S. Application Data

[63] Continuation-in-part of Ser. No. 858,421, May 1, 1986, abandoned.

[51] Int. Cl.$^4$ .......................... B27J 7/00; B27J 11/00; C01B 1/00
[52] U.S. Cl. ........................................ 536/84; 536/85; 536/86; 536/88
[58] Field of Search ........................ 536/84, 85, 86, 88

[56] References Cited

U.S. PATENT DOCUMENTS

| | | | |
|---|---|---|---|
| 2,814,619 | 11/1957 | Sloan | 536/84 |
| 2,814,620 | 11/1957 | Stewart et al. | 536/86 |
| 4,076,935 | 2/1978 | Eichenseer et al. | 536/88 |
| 4,091,205 | 5/1978 | Onda et al. | 536/85 |
| 4,415,124 | 11/1983 | Carduck et al. | 536/77 |
| 4,581,446 | 4/1986 | Schulz | 536/85 |

*Primary Examiner*—Morton Foelak
*Assistant Examiner*—Nathan M. Nutter

[57] ABSTRACT

High viscosity cellulose ether products are produced by grinding a substantially dry high molecular weight cellulose ether under conditions of mild mechanical impact such as those encountered in a high speed air swept impact mill. It has been found that such a cellulose ether product has several times the intrinsic viscosity of a product of substantially equivalent particle size by ball mill or hammer mill grinding.

12 Claims, No Drawings

GRINDING PROCESS FOR HIGH VISCOSITY CELLULOSE ETHERS

CROSS-REFERENCE TO RELATED APPLICATION

This is a continuation-in-part of copending U.S. application Ser. No. 858,421, filed May 1, 1986 and now abandoned.

BACKGROUND OF THE INVENTION

This invention relates to a method of preparing high viscosity cellulose ethers.

Cellulose ethers such as methylcellulose and hydroxypropyl methylcellulose are used as thickeners in such diverse applications as water-based paints, foods and cosmetics. Presently, the 2 percent aqueous solution viscosities for these products range from below 5 to a maximum of about 100,000 cps, with the exact value being a function of the molecular weight of the cellulose polymer backbone in the material. In general, the greater the molecular weight of the cellulose polymer the larger the intrinsic viscosity of the cellulose ether product. Both wood and cotton linter celluloses are used to prepare cellulose ethers, with economics favoring the use of wood pulp. The more expensive cotton linters have been required in the production of high viscosity products in the 100,000 cps range.

Cellulose ether products with intrinsic viscosities greater than 100,000 cps would be desirable for they would provide more efficient thickening with lower raw material usage and reduced cost. Production of such high viscosity cellulose ethers has not been possible, however, due to the chemical and mechanical degradation of the cellulose polymer backbone that occurs during the manufacturing process. For example, the presence of an oxidizing agent such as air during the alkalinization and etherification steps of the process significantly reduces the viscosity of the product. Viscosity is also lost if excess caustic is not neutralized before the product is extracted and dried. Even if care is taken to exclude oxidizing agents and to neutralize excess caustic before work up, there is still a significant viscosity loss when the material is ground in a ball mill, hammer mill or disk mill to give finished product. Therefore, because significant viscosity loss occurs when the cellulose ether is ground, it is difficult to prepare a product which has small particle size and high viscosity.

It would be desirable to have a process for preparing a cellulose ether product which has small particle size and there is minimal degradation of the cellulose polymer backbone. Thus, the resulting cellulose ether products would have higher intrinsic viscosities.

SUMMARY OF THE INVENTION

This invention is a process of reducing the particle size of a high molecular weight, a high viscosity cellulose ether without substantial change in viscosity, which process comprises grinding a substantially dry, high molecular weight cellulose ether in a high speed air swept impact mill.

Surprisingly, it has been found that a cellulose ether product prepared under such mild mechanical conditions has a greater intrinsic viscosity compared to a product of substantially equivalent particle size produced by such methods as ball mill grinding.

In another aspect, this invention is the high viscosity, reduced particle size, cellulose ether product made by grinding a high viscosity, substantially dry cellulose ether under conditions of a high speed air swept impact mill These cellulose ether products can be employed where only small amounts of cellulose ethers are desirable, but are needed as a thickening agent. In addition, since the cellulose ethers are sensitive to shearing, these higher viscosity cellulose ethers are useful in applications where viscosity reduction is desirable.

DETAILED DESCRIPTION OF THE INVENTION

This invention is a process for preparing high viscous cellulose ether particles with a fine particle size by impacting the particles with a high speed air swept impact mill.

The preferred cellulose ethers used in this invention are substituted with sodium carboxymethyl, methyl, ethyl, hydroxyethyl, hydroxypropyl, hydroxybutyl groups, and combinations thereof. The more preferred cellulose ethers of this invention are substituted with methyl, hydroxypropyl, hydroxybutyl groups, and combinations thereof. The most preferred cellulose ethers of this invention are methylcellulose having a methoxyl substitution of about 27 to about 32 weight percent and hydroxypropyl methylcellulose having a hydroxypropyl substitution of about 4 to about 32 weight percent and a methoxyl substitution of about 16 to about 30 weight percent. In addition, the high molecular weight, high viscosity cellulose ether used in this invention prior to grinding has a viscosity greater than 100,000 cps, preferably greater than 300,000 cps, and most preferably is within the range from about 100,000 to about 300,000 cps at 20° C.

The mild mechanical impact conditions of this invention are defined as those conditions under which the primary breakage of a particle results from direct contact of the particles with a fast moving part of an impact grinder. Unlike hammer mills, most breakage of the particles also occurs by particle-particle contact due to high air turbulence in the high speed air swept impact mill. Typically, the smaller particles are provided by larger particles contacting only one surface at time per contact. Such conditions are encountered, for example, by utilizing a high speed air swept impact mill. The particles are reduced in size by shear as they are sliced between the surfaces of the grinder. By impacting under the said conditions, high viscosity cellulose ether products are formed.

This mild mechanical impact mill avoids the severe mechanical degradation of the cellulose polymer backbone as seen with other methods of milling. For instance, a ball mill is a tumbling impact mill that uses hard balls, typically made of steel, as the grinding medium. In such a ball mill the primary breaking action of the particles occur as the material is caught between elements of the grinding medium or balls. The conditions of ball milling—the particle being pressed between two hard surfaces—is fundamentally different from that encountered with a high speed air swept impact mill in which the particle encounters just one hard surface during impact at a very high speed.

In addition to ball mills, hammer mills are used in grinding process. Due to process complications, fine cellulose ether particle sizes are difficult to produce. One such problem is that hammer mills do not readily release heat so it is very difficult to produce the fine particles. In addition to over heating problems, the hammer mills do not impact to produce particle size that are fine and in addition have very high viscosities.

In producing these high viscosity cellulose ethers, material is fed to one or more tiers of rotating blades that are only a few millimeters from the cylindrical inner wall. The wall is usually serrated to provide surfaces for impact that are near perpendicular to the line of travel for the impacted particles. The blades are mounted on a disc so that it is only slightly smaller in diameter than the tips of the blades. Material is swept through this annulus by an air stream that is blown through the mill. A high degree of impact occurs in this annulus between the blades and the material, the inner wall and the material, and between particles.

Air is the primary motivating force to move material through the mill, unlike a hammer mill. This air provides turbulence for particle to particle impact. It also is the heat transfer medium to remove the heat of milling. Thus, this process avoids the difficulties that are experienced with hammer mills, such as polymer degradation and fires due to insufficient heat removal.

Mild mechanical impact provides a cellulose ether product with greater intrinsic viscosity compared to a product of substantially equivalent particle size produced by such methods as ball mill grinding. Preferably, such viscosity will be several times greater such as at least 1.5 times, more preferably at least 2 times, and most preferably at least 3 times the viscosity of a ball milled product. By "substantially equivalent" particle size is meant that the products are classified by passing through a sizing screen of equivalent U.S. mesh size.

Generally, the high molecular weight cellulose ethers are substantially dry before mildly mechanically impacting. By "substantially dry" cellulose ether is meant that the cellulose ether has a water content of less than about 3 percent by weight. Although, higher water contents are acceptable and will have no adverse effect on the invention other than to lower the efficiency of the grinding process.

This mild mechanical impacting process forms a cellulose ether product that retains a high molecular weight with substantially the same viscosity as the initial cellulose ether has before grinding. The high molecular weight, high viscosity cellulose ether product has a viscosity greater than 100,000 cps, preferably greater than 300,000 cps, and most preferably from about 100,000 to about 300,000 cps at 20° C.

The particle size of the cellulose ether products, after grinding, is a very fine granule, from about 40 to about 400 U.S. mesh, preferably about 80 to about 325 U.S. mesh.

Thus, the process of this invention makes possible the production of cellulose ether products of higher intrinsic viscosities than were previously available. Such high viscosity products will provide more efficient thickening and thus reduced cost. In addition, the process of this invention makes possible the production of cellulose ether products with a viscosity from about 100,000 cps to about 300,000 cps and greater without the use of expensive cotton linters as raw material. In addition, with the several fold increase in product viscosity that this invention provides, it is possible to use less expensive lower-molecular-weight wood pulps and still achieve cellulose ether product viscosities in this range.

As an example of this process an unground sample of hydroxypropyl methylcellulose is first determined to have a 2 percent aqueous solution viscosity of about 316,000 cps. The viscosity is measured by a method of using Ubbelohde tube ASTM D1347. Grinding a portion of this material without any caustic present in a MIKROPULVERIZER ACM rotary impact air swept impact mill to a particle size of finer than 80 U.S. mesh produces a hydroxypropyl methylcellulose product with a 2 percent solution viscosity of about 286,000 cps. By comparison, grinding a portion of this unground material in a ball mill grinder of 30 foot length and 6 foot diameter containing 1.5 inch steel balls, to the same finer than 80 U.S. mesh particle size produces a hydroxypropyl methylcellulose product with a 2 percent solution viscosity of only about 100,000 cps.

What is claimed is:

1. A process of reducing the particle size of a high molecular weight, a high viscosity cellulose ether without substantial change in viscosity, which process comprises grinding a substantially dry, high molecular weight cellulose ether in a high speed air swept impact mill, wherein prior to grinding, the cellulose ether has a viscosity greater than about 100,000 cps at 20° C.

2. The process in claim 1, wherein the cellulose ether product is methylcellulose ether or a hydroxypropyl methylcellulose ether.

3. The process in claim 2, wherein the methylcellulose ether product has a methoxyl substitution of about 27 to about 32 weight percent and the hydroxypropyl methylcellulose has a hydroxypropyl substitution of about 4 to about 32 weight percent and a methoxyl substitution of about 16 to about 30 weight percent.

4. The process in claim 1 wherein the high molecular weight cellulose ether, prior to grinding, has a viscosity greater than about 300,000 cps to at 20° C.

5. The process in claim 1 wherein the high molecular weight cellulose ether, prior to grinding, has a viscosity from about 100,000 to about 300,000 cps at 20° C.

6. The process in claim 1 wherein the cellulose ether product has a particle size of about from about 40 to about 400 U.S. mesh.

7. The process in claim 1 wherein the cellulose ether product has a particle size of about 80 to about 325 U.S. mesh.

8. A high molecular weight, high viscosity cellulose ether product prepared by the process of claim 1.

9. The product of claim 8 wherein the high molecular weight, high viscosity, cellulose ether product has a viscosity greater than about 100,000 cps at 20° C.

10. The product of claim 8 wherein the high molecular weight, high viscosity, cellulose ether product has a viscosity from about 100,000 to about 300,000 cps at 20° C.

11. The product of claim 8 wherein the high molecular weight, high viscosity, cellulose ether product has a particle size of from about 80 to about 325 U.S. mesh.

12. The product of claim 8 wherein the high molecular weight, high viscosity, cellulose ether product is methylcellulose ether is a hydroxypropyl methylcellulose ether.

* * * * *